(No Model.)

J. R. HOFFMAN.
EMERY WHEEL FOR SHARPENING SAWS.

No. 271,634. Patented Feb. 6, 1883.

Witnesses.

Inventor:
Jacob R. Hoffman
By L. B. Coupland & Co.
Atty.

UNITED STATES PATENT OFFICE.

JACOB R. HOFFMAN, OF FORT WAYNE, INDIANA.

EMERY-WHEEL FOR SHARPENING SAWS.

SPECIFICATION forming part of Letters Patent No. 271,634, dated February 6, 1883.

Application filed November 24, 1882. (No model.)

*To all whom it may concern:*

Be it known that I, JACOB R. HOFFMAN, of Fort Wayne, county of Allen, State of Indiana, have invented a new and useful Improvement in Emery-Wheels for Sharpening Saws, of which the following is a full, clear, and exact description, that will enable others to make and use the same, reference being had to the accompanying drawings, and to letters of reference marked thereon, forming a part of this specification.

This invention relates to improvements in that class of emery or grinding wheels which are more especially intended for sharpening saws, the object being to so shape and combine two emery-wheels as to leave a space between them which will correspond to the contour of the tooth, and also to provide an annular recess at the junction of said wheels for the reception of the extreme point of the tooth, whereby the same is left perfectly sharp and of the desired form, all as will be hereinafter more fully set forth in detail.

Figure 1:
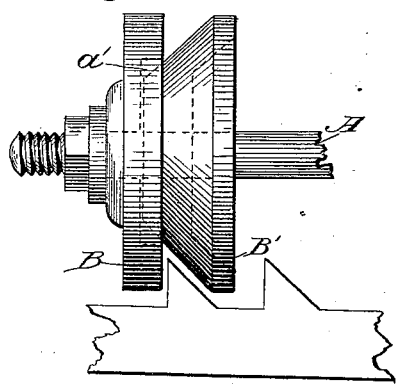
Figure 2:
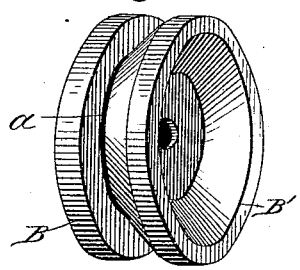

Figure 1 is a side elevation of a device embodying my improved features; Fig. 2, a view in perspective; and Figs. 3 and 4 show the two wheels or grinding-disks separated from each other.

Referring to the drawings, A represents the arbor upon which the grinding-wheels are mounted.

Figure 3:
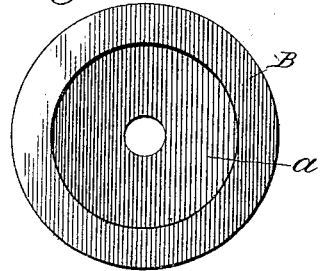
Figure 4:
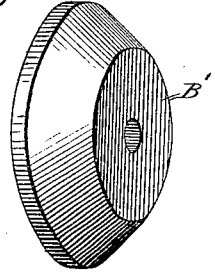

B is a disk-shaped wheel, provided on its inside face with an annular recess, a, as indicated by the dotted lines a' in Fig. 1 and shown by the inner circle in Fig. 3 of the drawings.

The second or companion wheel, C, presents a beveled grinding-surface relative to the disk B, and partakes of the form of a frustum or cone wheel. The diameter of this cone-wheel at the point of union or junction with the companion-wheel is somewhat less than the area of the recess a, as indicated by the dotted lines in Fig. 1 of the drawings.

The essential feature of my improvement is the annular recess a, as the tooth of the saw is thereby prevented from bottoming during the process of sharpening, and cannot be dulled or blunted, but, on the contrary, a fine sharp point of the desired shape is produced.

The process of dressing the saw is accomplished by one movement of the grinding-wheels across the same, the triangular or V-shaped notch or space between the two wheels conforming to the particular shape of the tooth and bringing the grinding-surfaces in contact with both sides of the tooth at the same time.

The annular notch or space between the grinding-surfaces may be of such an outline or angle as to adapt the device to dress any particular shaped tooth, the annular recess for the reception of the extreme point of the tooth remaining as the essential feature. Fig. 1 clearly illustrates the relative position of the saw and grinding-surfaces.

The two grinding-wheels may be secured together with relation to each other by the use of any adhesive composition or other suitable means.

I do not strictly confine myself to the employment of emery-wheels in the practical application of my invention, but may make use of any other substance or material suitable for the purpose. I may also find it advantageous to mold or form the two grinding-wheels into one instead of two and attaching them together, no matter which way, however, so long as the principal object is obtained of dressing both sides of the tooth at the same time, and providing a recess to receive the point of the tooth and leave the same in a fine sharp condition.

Having thus described my invention, what I claim as new, and desire to secure by Letters Patent, is—

The combination, with the grinding-wheel B', of the companion wheel B, provided with the annular recess a, the diameter of said recess being greater than the diameter of the portion of the cone-wheel B', which lies in the same plane, substantially as and for the purpose set forth.

JACOB R. HOFFMAN.

Witnesses:
  F. K. BLAKE,
  WM. H. HOFFMAN.